(12) United States Patent
Blicker

(10) Patent No.: US 8,351,970 B2
(45) Date of Patent: Jan. 8, 2013

(54) METHOD FOR EXTENDING A PUSH TO TALK COMMUNICATION SERVICE

(75) Inventor: Stephan Blicker, Wachtberg-Villip (DE)

(73) Assignee: T-Mobile International AG & Co. KG, Bonn (DE)

( * ) Notice: Subject to any disclaimer, the term of this patent is extended or adjusted under 35 U.S.C. 154(b) by 704 days.

(21) Appl. No.: 11/989,879

(22) PCT Filed: Aug. 1, 2006

(86) PCT No.: PCT/EP2006/007599
§ 371 (c)(1),
(2), (4) Date: Mar. 29, 2010

(87) PCT Pub. No.: WO2007/014750
PCT Pub. Date: Feb. 8, 2007

(65) Prior Publication Data
US 2010/0190489 A1 Jul. 29, 2010

(30) Foreign Application Priority Data

Aug. 4, 2005 (DE) .......................... 10 2005 037 317
Nov. 29, 2005 (DE) .......................... 10 2005 057 235

(51) Int. Cl.
*H04B 7/00* (2006.01)

(52) U.S. Cl. ........ 455/518; 455/519; 455/520; 455/90.2

(58) Field of Classification Search ................ 455/90.2, 455/412.1, 414.1, 518–520, 416; 370/328, 370/338, 352, 389
See application file for complete search history.

(56) References Cited

U.S. PATENT DOCUMENTS

| 7,920,886 | B1 * | 4/2011 | Lai et al. ........................ 455/518 |
| 2004/0042438 | A1 * | 3/2004 | Jiang et al. .................... 370/342 |
| 2004/0219925 | A1 | 11/2004 | Ahya |
| 2006/0002403 | A1 * | 1/2006 | Bettis et al. .................... 370/401 |
| 2006/0056361 | A1 * | 3/2006 | Jiang et al. .................... 370/335 |

FOREIGN PATENT DOCUMENTS

| WO | 2004 028112 | 4/2004 |
| WO | 2004 086715 | 10/2004 |
| WO | 2004 100419 | 11/2004 |
| WO | 2004 105413 | 12/2004 |

OTHER PUBLICATIONS

"Push to Talk Over Cellular Requirements Version 1.0;" Open Mobile Alliance, Mar. 29, 2005, pp. 1-77.
"Push to Talk Over Cellular (PoC) Architecture Candidate Version 1.0;" Open Mobile Alliance, Apr. 28, 2005, pp. 1-156.

* cited by examiner

*Primary Examiner* — Dominic E Rego
(74) *Attorney, Agent, or Firm* — Cooper & Dunham LLP

(57) ABSTRACT

The invention relates to a method and system for extending a known push to talk service in such a way that novel application capabilities are obtained. According to said invention, the use of said push to talk techniques is carried out by adding a functionality making it possible to transmit other forms of data besides speech.

12 Claims, 3 Drawing Sheets

METHOD FOR EXTENDING A PUSH TO TALK COMMUNICATION SERVICE

The invention relates to a method and a system for upgrading the known push-to-talk communication service, for the purpose of new usage capabilities.

The push-to-talk service is already available in some mobile communication networks. It provides the capability to use the mobile telephone as a walkie-talkie. The service is characterized by a half-duplex voice-over-IP application using the RTP protocol (Real Time Transport Protocol) for transport of the voice components.

However, the push-to-talk service offers additional capabilities, that is to say for example:
  group-related transmission (the 1-to-many communication type based on predefined or ad-hoc defined or chat groups)
  quasi presence information resulting from the fact that the push-to-talk server knows which MSISDN to connect to the specific group.

These functions have been introduced and are prior art. What has not been provided so far with the push-to-talk service is the capability to transmit data other than voice.

The object of the invention is therefore to provide a method and a system to upgrade to the push-to-talk service, for transmission of data other than voice.

According to the invention, this object is achieved by the features of the independent claims.

Preferred refinements to the invention are specified in the dependent claims.

Modern push-to-talk systems offer voice transmission. However, voice transmission is only one feasible embodiment of push-to-talk. It is, however, possible to transmit for example images, music, files, videos just as well as just voice in a message. The invention describes a process and method in order to link external companies to the push-to-talk system, to carry out customer subscriptions as a function of media data which is transmitted using push-to-talk. It describes the additional functionalities which are used in the existing systems for the network and the mobile terminal. The major advantage of this new method is that push-to-talk is used as a transmission channel for all types of half-duplex communication with different media. Furthermore, the invention describes specific applications as to how this could be offered by external service providers.

The invention describes an enabling service push-to-talk-procedure/method for sending messages to third parties using the push-to-talk over cellular as a carrier. It also describes a method/procedure in order to use push-to-talk as an enabling service for dialing communication applications for third parties.

The method for use of the push-to-talk service is upgraded according to the invention such that the addition can be used as an enabling service for multimedia chat applications for third parties. The group functionality of the mobile-radio-specific push-to-talk functionality PoC is used for this purpose.

The "on-line notification for third parties" service idea is formed on all PoC capabilities using these methods, but with additional methods being provided:
  Provision of infrastructure for downloading media, such as text, voice, image.
  Capability to transmit media, for example jpg, gif, mid, mpg . . . , other than voice-only signals.
  Offering an infrastructure from the network operator to third parties such as COMPANY 1, COMPANY 2 etc., in order to increase the traffic on the network operator's own access networks.

The process/the method for use of PoC as an enabling system or service idea for an "on-line notification for third parties" and on-line downloading for third parties as an example of a service for generic use of PoC as enabling platform for the transmission of data within groups.

1) The network operator offers a third party, for example the COMPANY 1, methods/functions in order to latch on-line messages to customers who are connected to corresponding PoC groups, so-called join-in groups.
2) The network operator offers means in order to synchronize the third-party's office applications by means of PoC group management functions.
3) The network operator offers third parties, for example a service provider such as COMPANY 2, methods in order to create their own chat groups, based on the COMPANY 2 subscription base. This means that COMPANY 2 is responsible for allowing specific MSISDNs to access specific join-in groups which are managed by the network operator.
4) The network operator offers third parties, for example a service provider such as COMPANY 2, methods in order to transmit media from the landline network to those mobile telephones who are connected to the chat groups, using the "Push" method.

SERVICE EXAMPLE 1

Applications of a Third Party: On-line Notification

1) COMPANY 1 wishes to access people who are traveling on business. They provide an access chat group for these people. The group of those traveling on business is likewise stored, for example, in an Outlook distribution list.
2) The distribution list is synchronous with the PoC group list management system, and uses a specific interface between the office applications of the third party and the PoC group list management system of the network operator.
3) Those traveling on business from the COMPANY 1 enter the group.
4) "On-line messages" are sent via the PoC carrier. Customers of COMPANY 1 need not start a different application as a PoC. They do not need to start any additional POP3 clients, but can simply use the existing PoC clients.

SERVICE EXAMPLE 2

Application Downloading Chat of a Third Party

1) The COMPANY 2 offers a website for ringing tones. In this website, it mentions access chat groups for the network operator's own push-to-talk based on categorizations and interests.
2) The customers subscribe to chat groups based on categorization and interests, using the topic channels of COMPANY 2 (website, call center . . . ) COMPANY 2 is subscribed to by the customers.
3) The customers enter the groups based on categorizations and interests which are managed (hosted) by the network operator.

4) The customers receive media from COMPANY 2. COMPANY 2 uses push-to-talk in order to send media based on group categorization and interests.

SERVICE EXAMPLE 3

Third-party Use: Media Marketing, Similar to "Peer-to-peer"

1) The third-party offers a chat group for media marketing.
2) The customers subscribe and access the media marketing group.
3) The customers press the push-to-talk button and transmit media to other subscribers irrespective of the type of media (gif, voice, wav, etc.). The customer must indicate what type of media he wishes to send and receive. This is a new functionality. The user in the group may need to subscribe to different types of media. The subscription for new media is likewise novel.

Advantages for Network Operators and Customers:
a) Mobile customers who enter the groups must pay network operators for entering the groups (payment by standard-daily usage fee or monthly usage fee). The network operator therefore earns money for traditional "transport", and the subscriber base increases.
b) Furthermore, the network operator can earn money for downloading on a commercial basis, based on network operator/service provider agreements. In addition the network operator can earn money from fees for managing (hosting) the groups.
c) The network operators save money because they do not need to develop a complex push-proxy infrastructure (as for e-mail applications), they jointly use already existing PoC equipment for the termination of media such as text (e-mail style media) or other media.
d) Usefulness for the customer: simplicity of the method. There is no longer any reason for configuration of further clients such as POP3. Improvement in customer satisfaction.
e) Integration in office applications of customers of third parties is possible. Simple to adapt, for example Outlook distribution lists with PoC group list management functions.
f) The network operator could offer different third-party chat groups based on subscription. For example, the network operator could offer video chat which, because of the greater bandwidth used, is more expensive than simple text chat using a PoC carrier.

One exemplary embodiment of the invention will be described in more detail with reference to the drawings.

Figure 1:
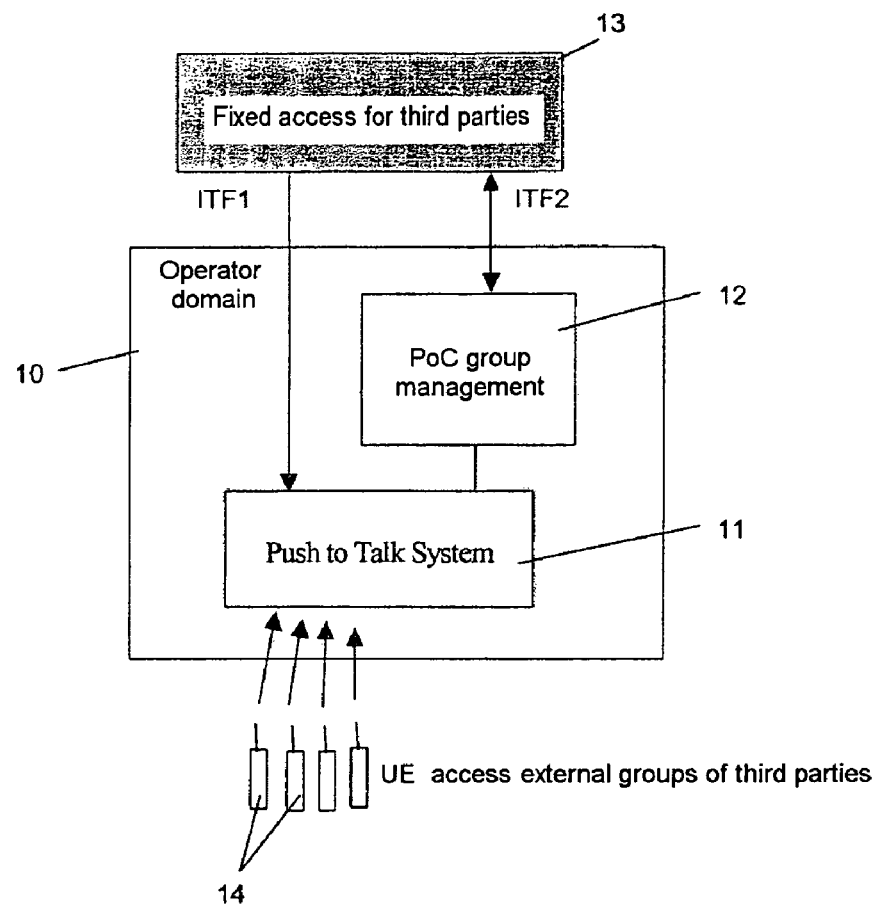
FIG. 1 shows, schematically, the architecture of the push-to-talk system according to the invention.

FIG. 1 shows a simplified form of the architecture of the push-to-talk system according to the invention.
1) The network operator domain 10 has a subscriber base comprising a PoC system 11 and a PoC group management system 12. Various subscribers can subscribe to different PoC groups via the PoC system, using PoC terminals 14.
2) The network operator 10 must provide two new interfaces for access by third parties 13:
A first interface ITF1 in order to allow external service providers to set up customers on a subscription basis in join-in chat groups. This interface is also used for synchronization of office applications with the PoC group management system 12.
A second interface ITF2, in order to terminate media contents as a function of the subscribers to the chat group (in particular text such as e-mail-similar media).
New media-based subscriptions. COMPANY 2 or others could distinguish between the customers on the basis of the media subscriptions.
A new media-based subscription must be checked in the PoC system 11.
New media-based groups must be implemented in the PoC system 11.
Assessment capabilities of the media must be integrated in the PoC terminals 14. The terminals 14 must offer means to assess media and to log in with specific media parameters.
The UNI (user network interface) protocol must be adapted in order to support media information during the group log-on. UNI is an interface between a terminal device, or terminal matching, and the network connection.
3) The network operator 10 must provide additional functions for access by third parties 13, for authentication, subscriber charging and billing between service providers and network operators.
4) The interface to the PoC group management system 12 must be adapted. The subscription is upgraded to subscriptions for media.
5) The interface to the push-to-talk system 11 must be upgraded. It must be possible to extract group MSISDNs in a favorable form.

Figure 2:
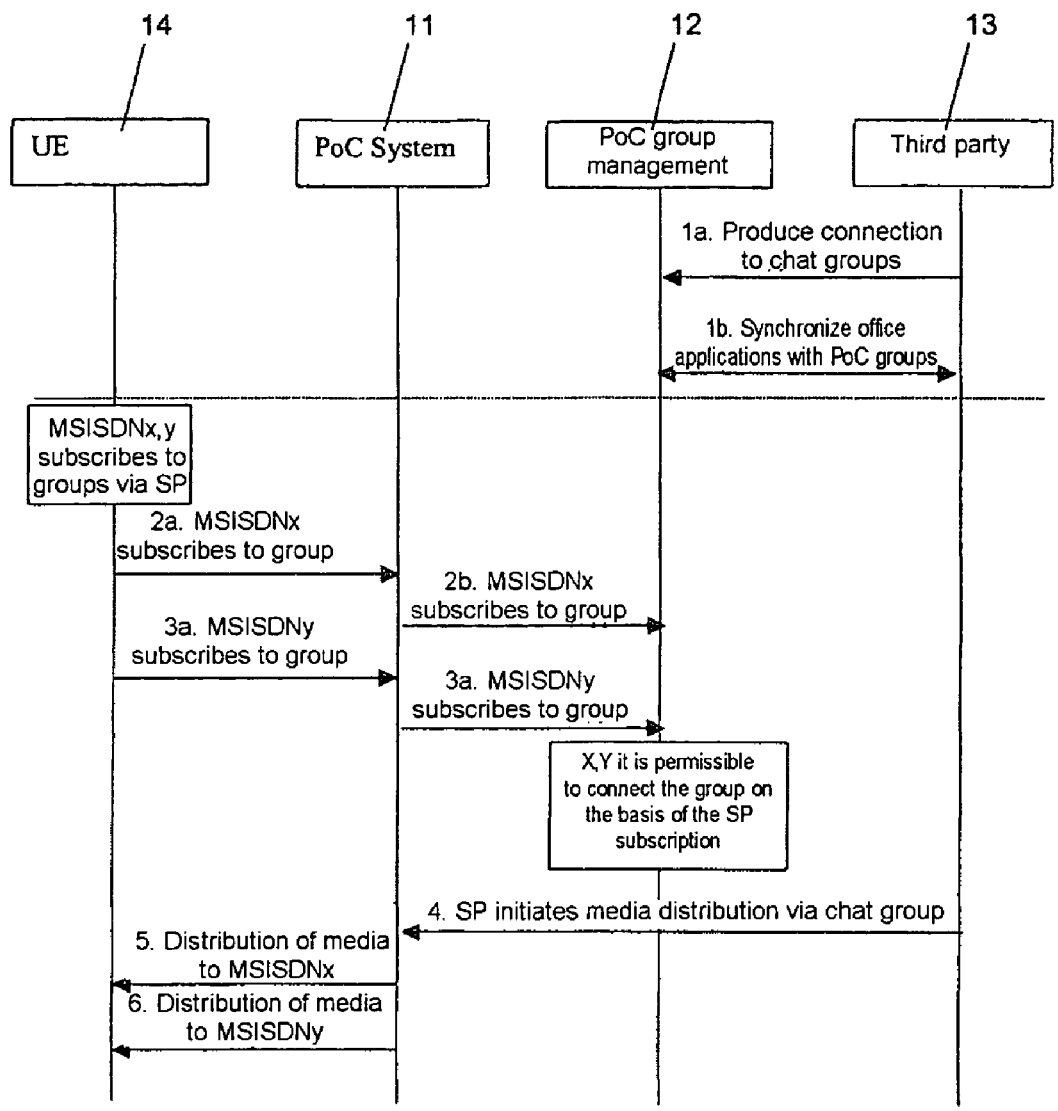
FIG. 2 shows a method procedure for a first service example according to the invention.

FIG. 2 shows a first example of a PoC service according to the invention. The following steps are illustrated in FIG. 2:
1. A third party (service provider) 13 creates a large number of new join-in groups (PoC groups), for example ringing tones, animated images etc., and transmits the group names by means of a website or advertisements to potential subscribers. Mobile radio subscribers with the mobile radio telephone numbers MSISDNx and MSISDNy subscribe to the PoC groups and are provided through their terminal 14 with access via the third parties to these PoC groups. In addition, the third party 13 synchronizes his office application with the PoC group management system 12.
2. a/b. Subscriber (terminal 14) with MSISDNx accesses the chat group via the PoC system 11.
3. a/b. Subscriber with MSISDNy accesses the chat group via the PoC system 11; both x and y may be connected.
4. The third party 13 distributes new media, for example e-mail text, additional media, attachments, to the PoC system 11.
5. The PoC system 11 distributes media to the terminal 14 with MSISDNx using the PoC standard with specific media.
6. The PoC system distributes media to MSISDNy using the PoC standard with specific media.

Figure 3:
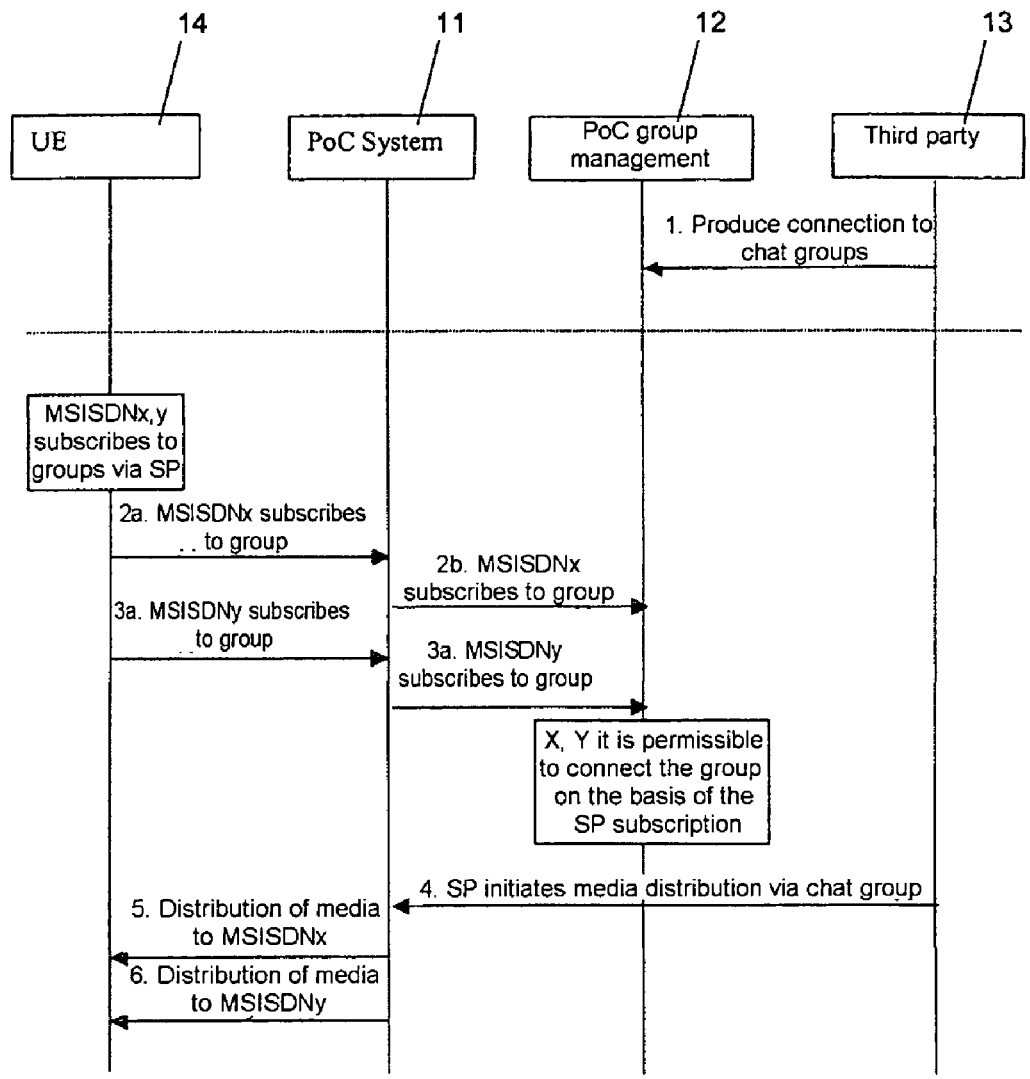
FIG. 3 shows a method procedure for a second service example according to the invention.

FIG. 3 shows a second example of a PoC service according to the invention. The following steps are illustrated in FIG. 3:
1. A third party, for example a service provider, 13 creates a large number of new join-in groups, for example ringing tones, animated images etc., and transmits the group names by means of a website or advertisements to potential subscribers. Mobile radio subscribers 14 with the telephone numbers MSISDNx and MSISDNy subscribe to the groups and are provided with access via the third parties 13. In addition, the third party synchronizes his office application with the PoC group management system 12.

2. a/b. Subscriber with MSISDNx accesses the chat group via the PoC system 11.

3. a/b. Subscriber with MSISDNy accesses the chat group via the PoC system 11; both x and y may be connected.

4. The third party 13 distributes new media, for example e-mail text, additional media, attachments, to the PoC system 11.

5. The PoC system 11 distributes media to the subscriber 14 with MSISDNx using the PoC standard with specific media.

6. The PoC system distributes media to the subscriber 10 with MSISDNy using the PoC standard with specific media.

The PoC system 11 may be used as an enabling system for transport of media of various types (not just a voice). The specific functions in the PoC system 11, in particular the group management and chat groups, can be offered to third parties 13 (service providers) in order to provide download capabilities and media distribution capabilities. Network operators 10 may offer PoC as an enabling carrier based on media subscriptions.

A large number of other services can also be formed on the basis of PoC functionality.

The invention claimed is:

1. A method for using push-to-talk technology, characterized by provision of a network operator domain (10) having a subscriber base comprising a PoC system (11) and a PoC group management system (12), in which case various subscribers can subscribe to different PoC groups via the PoC system (11), using PoC terminals (14), with a functionality being added in order to send data other than voice via the PoC system (11), characterized in that the network operator (10) provides two new interfaces for access by third parties (13) to the PoC system (11), in which case a first interface ITF1 is provided in order to allow external service providers to set up customers on a subscription basis in PoC groups, and in that a second interface ITF2 is provided in order to terminate media contents as a function of the subscribers to the PoC group.

2. The method as claimed in claim 1, characterized in that push-to-talk, PoC, is used as the transmission channel for all types of half-duplex communication with different media.

3. The method as claimed in claim 1, characterized in that the first interface ITF1 is used for synchronization of office applications with the PoC group management system (12).

4. The method as claimed in claim 1, characterized in that terminals (14) provide means in order to assess media and to log in with the PoC system (11) using specific media parameters.

5. The method as claimed in claim 1, characterized in that the UNI protocol is adapted in order to support media information during the group log-on.

6. The method as claimed in claim 1, characterized in that the network operator (10) provides additional functions for access by third parties (13), for authentication, subscriber charging and billing between service providers and network operators.

7. The method as claimed in claim 1, characterized in that the interface to the PoC group management system (12) must be adapted, and the subscription is upgraded to subscriptions for media.

8. The method as claimed in claim 1, characterized in that the interface to the push-to-talk system (11) is upgraded, providing the capability to extract group MSISDNs.

9. The method as claimed in claim 1, characterized in that a third party (13) creates new PoC groups and transmits the group names to potential mobile radio subscribers, in that the mobile radio subscribers subscribe to the PoC groups and access these PoC groups using their terminal (14) via the third parties (13), in that the subscribers access the PoC group via the PoC system (11), in that the third party (13) transmits new media, for example e-mail text, additional media, attachments, to the PoC system (11), in that the PoC system (11) distributes the new media to the terminal (14) of the subscribers, using the PoC standard with assistance of specific media.

10. A mobile communication system for carrying out the method as claimed in claim 1, characterized by the addition of additional components in order to allow an existing push-to-talk service to send data other than voice, via the PoC system 11.

11. The mobile communication system as claimed in claim 10, characterized in that a network operator domain (10) has a subscriber base comprising a PoC system (11) and a PoC group management system (12), in which case various subscribers can subscribe to different PoC groups via the PoC system (11), using PoC terminals (14).

12. The mobile communication system as claimed in claim 10, characterized in that access for third parties (13) to the PoC system is set up and is in each case connected via an interface to the PoC system (11) and to the PoC group management system (12).

* * * * *